Oct. 30, 1928.
J. H. BROWN
1,689,225
LOCK NUT
Filed May 2, 1925
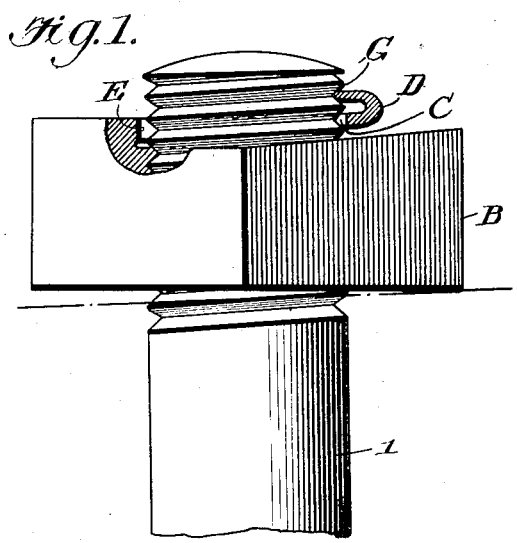
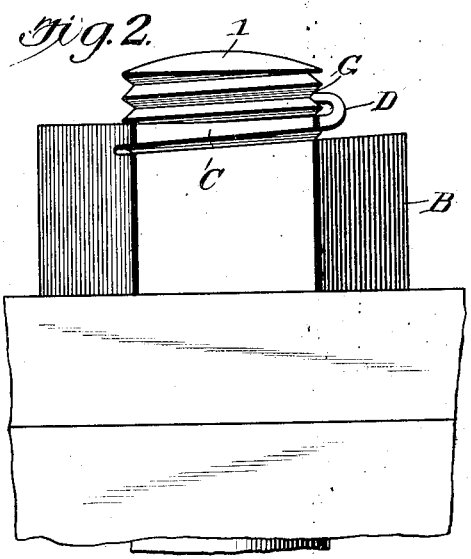
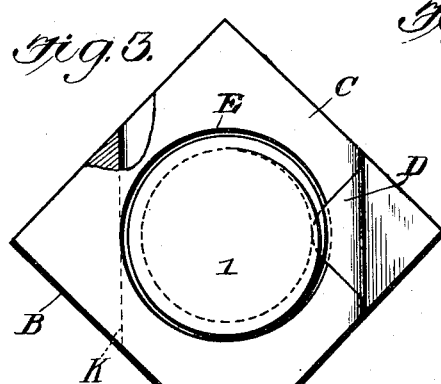
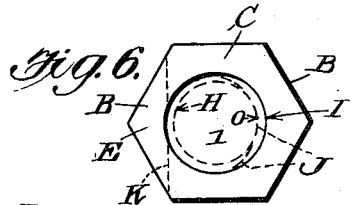
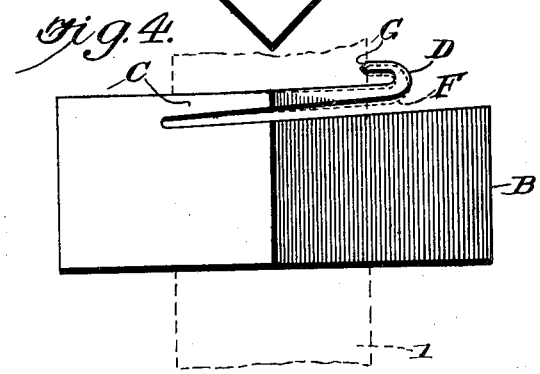
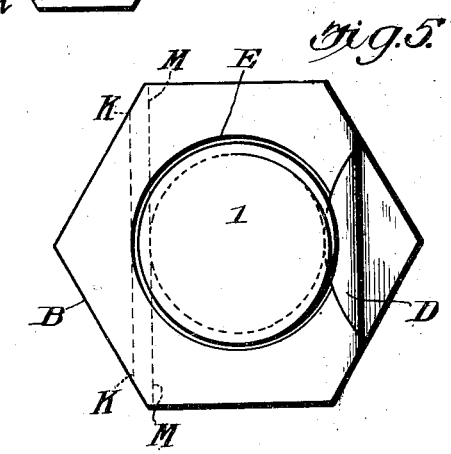
Inventor
James Hoyt Brown Patented Oct. 30, 1928.

1,689,225

UNITED STATES PATENT OFFICE.

JAMES HOYT BROWN, OF BOSTON, MASSACHUSETTS, ASSIGNOR TO BROWN LOCK NUT COMPANY, A CORPORATION OF DELAWARE.

LOCK NUT.

Application filed May 2, 1925. Serial No. 27,451.

This invention relates to lock or self-retaining nuts. The object of the invention is to devise a construction of a nut made from one piece of metal which in itself is efficient and positive in action, simple in form and inexpensive to make, capable of being easy and quickly handled and applied, removable when desired without injury to the thread in the nut or injury to the thread on the bolt.

With the foregoing and other objects in view which will appear as the description proceeds, the invention resides in the features of construction and in the combination and arrangement of parts hereinafter described and claimed, it being understood that changes in the features, combination and arrangement can be made within the scope of and without departing from the spirit of the invention. In the accompanying drawing forming part of the specification, Fig. 1 is a side elevation partly in section, with a bolt and my improved lock nut as it appears if the nut "B" is a loose fit on the bolt "1" before it is screwed entirely home; Fig. 2 is a view similar to Fig. 1 with my improved lock nut screwed home;

Fig. 3 is a plan view of the construction shown in Figs. 1 and 2;

Fig. 4 is a side elevation of my improved lock or self-retaining nut;

Fig. 5 is a similar view to Fig. 3, but is shown on a hexagon nut;

Figure 6 is a plan view showing a modification in which the lip or thread engaging portion of the ring lies in the plane of the ring.

Like reference numerals indicate corresponding parts in the different figures of the drawing.

Referring to Figs. 1, 2 and 3, the reference numeral 1 indicates a bolt. B represents the body portion of my improved lock nut which is threaded to receive the bolt 1. C represents the portion which has been formed by sawing or milling through from the out side of and into the body of the nut. The top portion C, is slightly bent up from the body B, as shown in Fig. 4. D shows a U-shaped bend made from the free end of the portion C and extends slightly over the bore of the threaded body portion of the nut as shown in Fig. 4 as indicated by "G". The extreme end of the bend U is made wedge shape as shown in Figs. 1, 2 and 4, for the purpose of contact with and into the thread of the bolt 1 as shown in Figs. 1 and 2, the wedge shape end of the portion C is the only portion of C that touches or comes in contact with the bolt 1, by reason of the portion C having a non-threaded opening through which the bolt will pass as the improved lock nut is screwed onto the bolt 1, as indicated in Figs. 3 and 5 by the bolt outside circular line E in the portion C. When the bolt 1 has been screwed through the body of the nut and passes through the opening E, in the portion C and reaches the wedge shape end of the U-shaped bend, the wedge end of the bend U will enter the thread of the bolt, at the starting point of the thread and will ride in between the threads on the bolt as shown in Figs. 1 and 2 and will immediately spring the portion c down toward the body portion of the nut, as indicated by the dotted line F in Fig. 4. The body of the nut B, will be slightly tilted as it appears in Fig. 1, if the nut is a loose fit on the bolt. The tilt will only occur when the nut "B" is a loose fit on the bolt "1" is caused by the spring tension of the portion C, the contact wedge shaped end of the U-bend gets the pressure downward from the under side of the thread just above the wedge G, as the nut B is screwed onto the bolt 1. The arrangement as described and shown in the drawing is the locking or retaining means of my invention and will positively retain said nut at any point on said bolt 1, and after the wedge shape end G has entered between the first and second threads on the bolt 1, the nut can not be shaken, jarred or vibrated loose, whether in or out of service, and when it is screwed home as shown in Fig. 2, the locking means is greater because when the nut is screwed home on the bolt, as shown in Fig. 2 of the drawing, the nut is then against a flat surface, and the portion C is sprung a trifle further down. This movement also forces the wedge shaped end G into the root of the thread on the bolt a little tighter, which causes a greater friction on the bolt.

In the modification shown in Figure 6, the thread engaging lip indicated at O, and corresponding to the thread-engaging portion G in Figure 4, lies in the plane of the ring C, and is preferably formed by swaging away the thread of the nut except at the portion opposite the point at which said ring is fixed in any suitable manner to the nut body B. The remaining features of the modification are as described in connection with the other form of the invention. I represents the outside circumference of the thread and H the inside circumference. The lip O is preferably crescent shape as indicated by the dotted lines so as to facilitate its engagement with the thread of the bolt.

The slot cut into the nut to form the portion "C" as it appears in Figure "4" may be made to the depth as indicated by the dotted line M M in Fig. 5 which will permit threads to be cut through the entire body of the nut opposite the bend U and will allow the tension of the portion C to have the same movement, but will increase the tension on the bolt. The tension may be regulated by the shape the portion C is made and the depth to which the parts are separated.

It will be understood that the portion "C" of my improved lock-nut may be bent away from or toward the body of the nut; in either case it will cause the required tension for retaining the nut on the threaded bolt.

If the portion "C" is bent away from the body of the nut, then, as the nut is threaded on a bolt, the U bend, when it engages in the thread of the bolt, causes the portion "C" to spring toward the body of the nut and this tension positively holds the nut in place on the bolt. If, however, the portion "C" is bent toward the body of the nut then, when the U bend engages in the thread of the bolt, the portion "C" will spring away from the body of the nut and by this tension it will likewise hold the nut in place on the bolt.

My improved lock-nut is contructed from regular stock nuts and eliminates lock washers, lock nuts, jam nuts, grip nuts, and the like. When the improved nut is used there will also be a saving in bolt metal because bolts can be made shorter on account of eliminating extra length to accommodate grip or jam nuts.

My improved lock-nut will not harm the threads of either bolt or nut and it can be used as often as any ordinary nut. I do not claim broadly the non-threaded opening through the portion "C".

What I claim as new is:

1. A lock-nut comprising a threaded nut-body slotted near one end to provide a ring resiliently connected with one side of said nut-body, said ring loosely surrounding approximately three quarters of the circumference of a bolt, said ring having, at the side opposite that at which it is joined to the nut-body, a lip, said lip exerting a resilient pressure on one side of the thread of the bolt.

2. A lock-nut comprising a threaded nut-body slotted near one end to provide a ring resiliently connected with one side of said nut-body, said ring loosely surrounding approximately three quarters of the circumference of a bolt, said ring having, at the side opposite that at which it is joined to the nut-body, a lip, said lip exerting a resilient pressure on one side of the thread of the bolt, said lip lying in a different plane from that of the ring.

3. A lock-nut comprising a threaded nut-body slotted near one end to provide a ring resiliently connected with one side of said nut-body, said ring loosely surrounding approximately three quarters of the circumference of a bolt, said ring having, at the side opposite that at which it is joined to the nut-body, a lip, said lip exerting a resilient pressure on one side of the thread of the bolt, said ring increasing in thickness toward the side at which it is joined to the nut-body.

4. A nut having a ring resiliently connected therewith and adapted loosely to surround a bolt when the bolt extends through said nut, said ring having at its free end a lip adapted to engage a thread of the bolt and to exert tension in a direction parallel with the axis of the bolt and thus tending when in action to throw the nut one way and the bolt the other way.

5. The combination in a nut of a nut body, a ring resiliently attached thereto and adapted loosely to surround a bolt when the bolt is positioned through the nut, said ring having a portion adapted to engage a thread of the bolt and to exert tension in a direction parallel with the bolt axis thereby to bind the nut on the bolt upon relative movement therebetween.

In testimony whereof I affix my signature.

JAMES HOYT BROWN.